United States Patent
Kang

(10) Patent No.: US 9,021,533 B2
(45) Date of Patent: Apr. 28, 2015

(54) METHOD AND APPARATUS TO PURCHASE CONTENTS BY USING PORTABLE STORAGE MEDIUM OR VIA NETWORK

(75) Inventor: Shin-wook Kang, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 835 days.

(21) Appl. No.: 12/029,675

(22) Filed: Feb. 12, 2008

(65) Prior Publication Data

US 2009/0049464 A1 Feb. 19, 2009

(30) Foreign Application Priority Data

Aug. 17, 2007 (KR) .......................... 10-2007-0083020

(51) Int. Cl.
| | |
|---|---|
| *H04N 5/445* | (2011.01) |
| *H04N 7/173* | (2011.01) |
| *G06Q 30/06* | (2012.01) |
| *H04N 21/418* | (2011.01) |
| *H04N 21/426* | (2011.01) |
| *H04N 21/433* | (2011.01) |
| *H04N 21/442* | (2011.01) |
| *H04N 21/472* | (2011.01) |
| *H04N 21/478* | (2011.01) |
| *H04N 21/8355* | (2011.01) |

(52) U.S. Cl.
CPC ........... *H04N 7/17318* (2013.01); *G06Q 30/06* (2013.01); *H04N 21/4184* (2013.01); *H04N 21/42692* (2013.01); *H04N 21/4334* (2013.01); *H04N 21/44204* (2013.01); *H04N 21/47202* (2013.01); *H04N 21/47815* (2013.01); *H04N 21/8355* (2013.01)

(58) Field of Classification Search
None
See application file for complete search history.

(56) References Cited

U.S. PATENT DOCUMENTS 6,526,577 B1 * 2/2003 Knudson et al. ................. 725/40
7,676,436 B2 * 3/2010 Harper ............................ 705/51

(Continued)

FOREIGN PATENT DOCUMENTS

| KR | 2002-0000289 | 1/2002 |
|---|---|---|
| KR | 10-2002-0075334 | 10/2002 |

(Continued)

OTHER PUBLICATIONS

Korean Office Action dated Feb. 25, 2014 issued in KR Application No. 10-2007-0083020.

(Continued)

*Primary Examiner* — Chenea Smith
(74) *Attorney, Agent, or Firm* — Staas & Halsey LLP

(57) ABSTRACT

Users of a method and apparatus to purchase (e.g., rent or buy) contents using a portable storage medium, via a network or the like. Contents purchased using embodiments of a method and apparatus may be developed to be automatically deleted or to be non-reproducible after being reproduced one time or after a predetermined period. Accordingly, users do not need to return borrowed or purchased contents. Also an owner of a contents rental shop may prevent contents from being unfairly reproduced. Further, user inconvenience due to the conventional manner in which users have to memorize information related to the contents and visit a rental shop to obtain desired contents may be avoided or decreased. Portable storage mediums or network resources of exemplary methods and apparatuses may be repeatedly used (e.g., without limitation), and thus may contribute to the saving of resources.

33 Claims, 9 Drawing Sheets

(56) References Cited

U.S. PATENT DOCUMENTS

| | | |
|---|---|---|
| 8,122,466 B2 * | 2/2012 | Rothschild ................... 725/32 |
| 8,260,656 B1 * | 9/2012 | Harbick et al. ............. 705/7.31 |
| 2002/0095680 A1 * | 7/2002 | Davidson ..................... 725/87 |
| 2003/0056211 A1 * | 3/2003 | Van Den Heuvel ............ 725/25 |
| 2003/0061619 A1 * | 3/2003 | Giammaressi ................ 725/95 |
| 2003/0110078 A1 * | 6/2003 | Chang et al. .................. 705/14 |
| 2003/0110502 A1 * | 6/2003 | Creed et al. ................... 725/86 |
| 2003/0229898 A1 * | 12/2003 | Babu et al. .................... 725/87 |
| 2006/0253887 A1 * | 11/2006 | Greene et al. ................ 725/118 |
| 2007/0056013 A1 * | 3/2007 | Duncan ....................... 725/134 |
| 2007/0091206 A1 * | 4/2007 | Bloebaum .................... 348/460 |
| 2007/0103993 A1 * | 5/2007 | Mount et al. ............ 365/189.05 |
| 2007/0156521 A1 * | 7/2007 | Yates ............................ 705/14 |
| 2007/0260551 A1 * | 11/2007 | Eckleder ....................... 705/59 |
| 2007/0261070 A1 * | 11/2007 | Brown et al. ................... 725/9 |
| 2008/0016533 A1 * | 1/2008 | Rothschild ................... 725/60 |
| 2008/0098025 A1 * | 4/2008 | Vadlamani et al. .......... 707/102 |
| 2008/0127284 A1 * | 5/2008 | Kouniniotis .................. 725/91 |
| 2008/0155613 A1 * | 6/2008 | Benya et al. .................. 725/89 |

FOREIGN PATENT DOCUMENTS

| | | |
|---|---|---|
| KR | 10-2006-0079816 | 7/2006 |
| KR | 2006-100347 | 9/2006 |
| WO | 03/096699 | 11/2003 |

OTHER PUBLICATIONS

Korean Office Action mailed Jan. 19, 2015 in corresponding Korean Patent Application 10-2007-0083020.

* cited by examiner

METHOD AND APPARATUS TO PURCHASE CONTENTS BY USING PORTABLE STORAGE MEDIUM OR VIA NETWORK

CROSS-REFERENCE TO RELATED APPLICATIONS

This application claims the benefit of Korean Patent Application No. 10-2007-0083020, filed on Aug. 17, 2007, in the Korean Intellectual Property Office, the disclosure of which is incorporated herein in its entirety by reference.

BACKGROUND OF THE INVENTION

1. Field of the Invention

The present general inventive concept relates to a method and apparatus to purchase contents, and more particularly, to a method and apparatus by which users can purchase contents by using a portable storage medium or via a network.

2. Description of the Related Art

In FIG. 1, items (a) to (c) respectively illustrate a rental shop, a user, and a conventional reproducing apparatus, respectively, in a conventional method of renting or purchasing a movie stored in conventional portable storage mediums such as Compact Discs (CDs), Digital Video Disks (DVDs), Blue-ray Disk (BD), Video Cassettes, and the like.

Referring to FIG. 1, a user rents or purchases (hereinafter both referred to as a 'purchase') a conventional portable storage medium, in which a movie is stored, from a rental shop (a), and reproduces the movie by using a contents reproducing apparatus (c) of the user.

However, the aforementioned conventional method of purchasing a movie is inconvenient to users since the users have to go to a movie rental shop, search for a desired movie from among various movies, and purchase the desired movie storage medium. Also, due to a limited quantity of movie storage media, if all of the movie storage media of a desired movie have been purchased, users cannot purchase the desired movie.

Also, in some cases, movie contents, which are stored in the conventional portable storage mediums such as a CD and are to be sold, may be a series or may include a preview of a movie to be released at a later time, and thus, users may desire to watch the sequel of the series or the movie corresponding to the preview while watching the movie contents. In this case, the users have to memorize the titles of the movies while watching the movie contents, and visit a rental shop at a later time to purchase the sequel of the series or the movie of the preview.

However, recently, portable storage mediums using a Hard Disk Drive (HDD) or a flash memory have been developed, and these new portable storage mediums are characterized by mass storage capacity and capability of both writing and reading data compared with conventional portable storage mediums. Thus, it is much more convenient for a user to purchase such contents as a movie using these new mediums than the conventional mediums.

As another alternative to the conventional method of purchasing a movie, a method of purchasing movie contents via a network has been provided. That is, users download movies at home by using a Personal Computer (PC) or a digital television (TV), which are connected with a contents provider via a network, and watch the movies. Such a method, having many advantages as compared to the conventional method of purchasing contents by using the conventional portable storage mediums, however, still has disadvantages or problems that need to be addressed. For example, optical communication network by which massive contents can be downloaded without interruption is not yet widely supplied to the general public, and similar to the conventional method of purchasing contents by using the conventional portable storage mediums, such an alternative method does not provide a convenient method of purchasing the sequel to the movie, or the movie of the preview.

SUMMARY OF THE INVENTION

The present general inventive concept provides a method and apparatus to purchase or rent (hereinafter both referred to as 'purchase') contents with a portable mass storage medium capable of writing/reading data.

The present general inventive concept also provides a method and apparatus to purchase contents such as a movie of a preview, or the sequel of a movie via a network.

The present general inventive concept also provides methods and apparatus by which users can purchase contents by using a portable storage medium, via a network or the like, when the contents are related to contents being reproduced.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept may be achieved by providing a contents reproducing apparatus to purchase contents by using a portable storage medium, the contents reproducing apparatus including a purchase menu decoder to decode purchase menu data from among data related to reproduction of contents stored in the portable storage medium; and a memory controller to record a purchase list in the portable storage medium.

The foregoing and/or other aspects and utilities of the present general inventive concept may also be achieved by providing a contents reproducing apparatus to purchase contents via a network, the contents reproducing apparatus including a network interface to interface to perform data communication between a contents providing server and the contents reproducing apparatus, and a purchase menu decoder to decode purchase menu data from among data related to reproduction of contents received by the network interface.

The foregoing and/or other aspects and utilities of the present general inventive concept may also be achieved by providing a contents purchase system using a portable storage medium, the contents purchase system including a contents providing server to provide contents, a kiosk to transmit contents purchase information to the contents providing server, or receive data related to the reproduction of contents from the contents providing server, and store the data in the portable storage medium, and the portable storage medium to store contents purchase information of users, or data related to the reproduction of contents downloaded from the kiosk.

The foregoing and/or other aspects and utilities of the present general inventive concept may also be achieved by providing a method of purchasing contents, by which users purchase contents related to contents being reproduced, the method including reproducing contents, requesting a purchase of contents related to the contents being reproduced, and obtaining the applied contents.

The foregoing and/or other aspects and utilities of the present general inventive concept may also be achieved by providing a method of storing contents purchase information by using a portable storage medium, the method including displaying a contents purchase menu, requesting a purchase of contents by using the contents purchase menu, and storing information regarding the contents, applied for in the purchase, in the portable storage medium.

The foregoing and/or other aspects and utilities of the present general inventive concept may also be achieved by providing a method of purchasing contents by using a portable storage medium, the method including inserting the portable storage medium, in which a contents purchase list is stored, to a public terminal, selecting contents to be purchased by using the contents purchase list, and downloading data related to the reproduction of the selected contents to the public terminal, and thereby storing the data in the portable storage medium.

The foregoing and/or other aspects and utilities of the present general inventive concept may also be achieved by providing a method of purchasing contents via a network, the method including reproducing contents data, requesting a purchase of contents related to the contents data being reproduced, and transmitting purchase information regarding the contents, applied for in the purchase, to a contents providing server via the network.

The foregoing and/or other aspects and utilities of the present general inventive concept may also be achieved by providing a storage medium having recorded thereon a computer readable program for executing any one of disclosed methods in a computer.

The foregoing and/or other aspects and utilities of the present general inventive concept may also be achieved by providing a computer readable medium having stored thereon instructions for use with a content purchase system, the instructions including first instructions for displaying a contents purchase menu, second instructions for requesting a purchase of contents by using the contents purchase menu, and third instructions for storing information regarding the contents requested to purchase in the portable storage medium.

The foregoing and/or other aspects and utilities of the present general inventive concept may also be achieved by providing a method including reproducing audio/visual contents at a reproduction apparatus, and directly purchasing a movie corresponding to a currently viewed preview or a sequel to a currently viewed movie.

The foregoing and/or other aspects and utilities of the present general inventive concept may also be achieved by providing a contents purchase system including a contents providing server to provide contents, and an interface unit to communicate contents purchase information related to the contents data being reproduced to the contents providing server and download for limited reproduction selected contents identified by the contents purchase information.

The foregoing and/or other aspects and utilities of the present general inventive concept may also be achieved by providing a computer readable medium having stored thereon instructions for use with a contents purchase system, the instructions including first instructions for reproducing audio/visual contents at a reproduction apparatus, and second instructions for directly purchasing a movie corresponding to a currently viewed preview or a sequel to a currently viewed movie reproduced on a screen.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
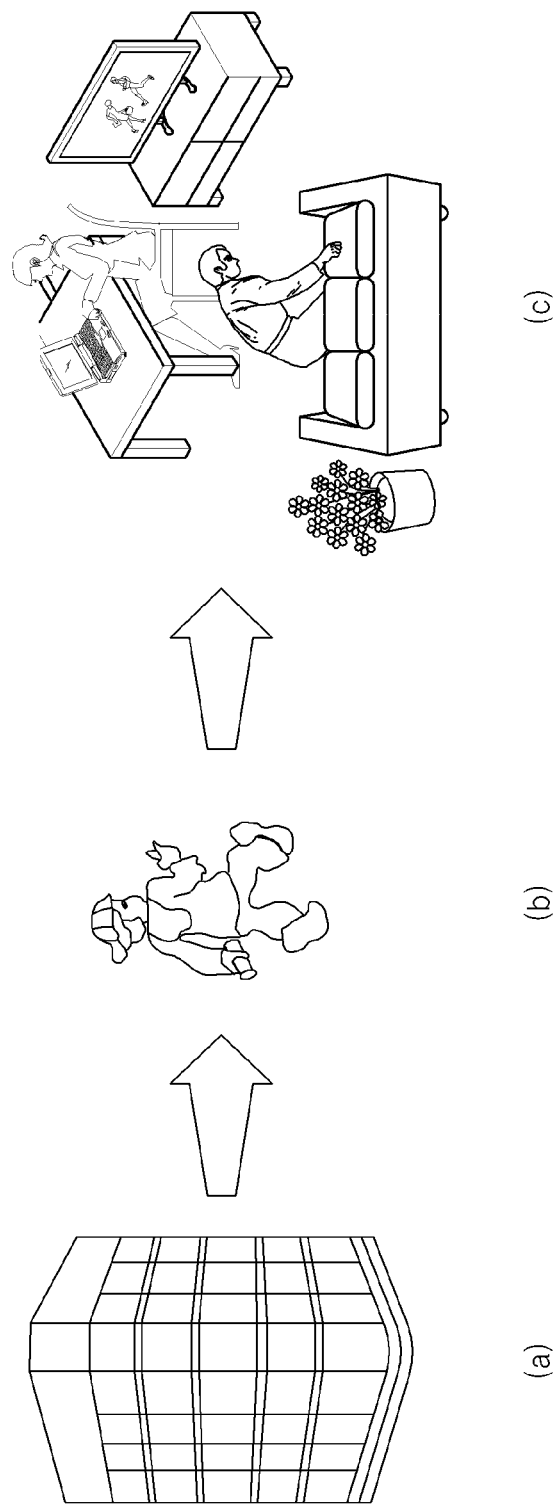
FIG. 1 is a diagram illustrating a rental shop, a user, and a conventional reproducing apparatus in a conventional method of purchasing a movie.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
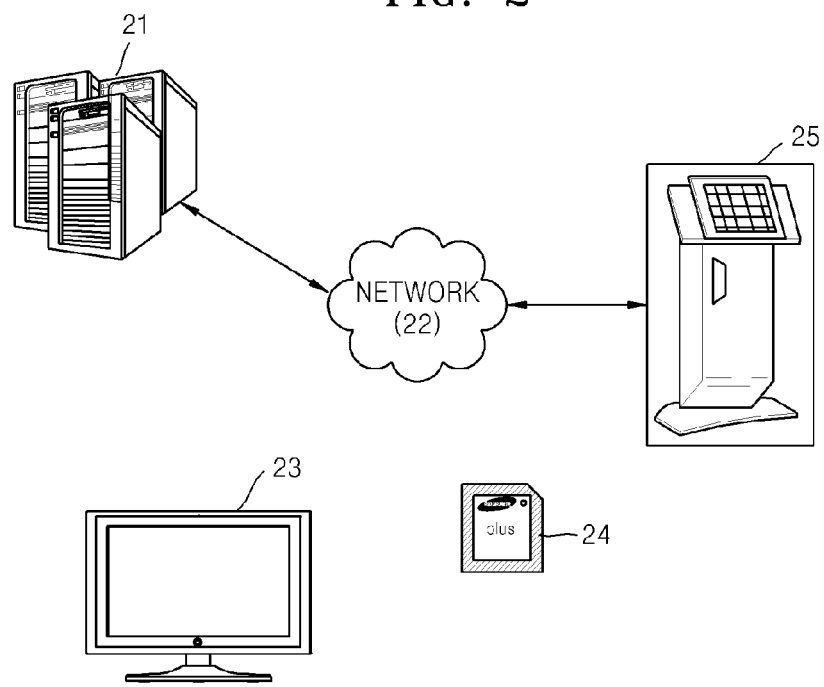
FIG. 2 is a diagram schematically illustrating a contents purchase system via a portable storage medium according to an embodiment of the present general inventive concept.

FIG. 2 is a diagram schematically illustrating a contents purchase system via a portable storage medium according to an embodiment of the present general inventive concept.

Referring to FIG. 2, one contents purchase system using a portable storage medium 24 according to the present general inventive concept may include a contents providing server 21, a wired/wireless network 22, a contents reproducing apparatus 23, the portable storage medium 24, and a kiosk 25.

The contents providing server 21 stores various contents data or content files, and provides users with the contents data or content files via the wired/wireless network 22. Contents provided from the contents providing server 21 according to the present general inventive concept include various kinds of Audio/Video (AV) data such as movies, music, television (TV) broadcasting programs, computer games, User Created Contents (UCC), and the like.

The kiosk 25 indicates a terminal of a contents distribution system installed in public places. For example, the kiosk 25 may include a multimedia computer that has installed therein various peripherals such as a touch screen, a card reader, a printer, a network, a speaker, a video camera, an interphone, a sensor, and the like, and provides a user application using a Graphical User Interface (GUI). The contents providing server 21 monitors an operation status of the kiosk 25 via the wired/wireless network 22. The contents providing server 21 may also diagnose and handle or repair defects of the kiosk 25. In particular, the kiosk 25 according to the present general inventive concept relays data transmission between the contents providing server 21 and users (or the portable storage medium 24). For example, the kiosk 25 may receive contents data from the contents providing server 21, and transmit the contents data to the portable storage medium 24 that is inserted or connected to or communicating with the kiosk 25. Inversely, the kiosk 25 may transmit contents purchase information of users to the contents providing server 21.

Users may use the portable storage medium 24 to download contents or request a contents purchase. The portable storage medium 24 is preferably a mass storage medium capable of storing a plurality of contents data at a time and capable of reading/writing data. Examples of the portable storage medium 24 may include a Universal Serial Bus (USB) memory, a secure digital card, a multimedia card, a compact flash memory, an extreme disk, and the like.

Figure 4A:
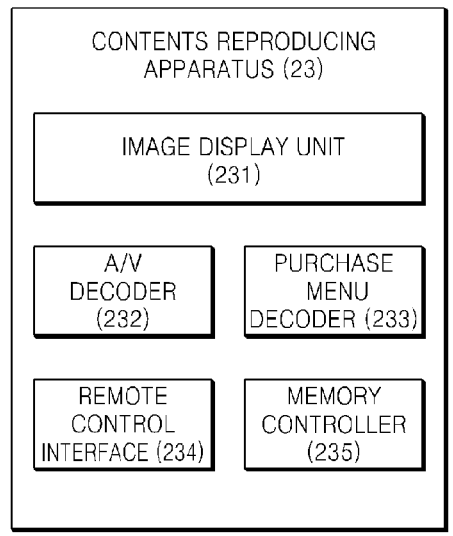
FIGS. 4A and 4B are diagrams schematically illustrating a contents reproducing apparatus in the contents purchase system according to embodiments of the present general inventive concept.

As illustrated in FIG. 4A, an exemplary embodiment of the contents reproducing apparatus 23 in the contents purchase system using the portable storage medium 24 includes an A/V decoder 232, and an image display unit 231 as components for reproducing contents. Besides these components for reproducing contents, the contents reproducing apparatus 23 may further include a remote control interface 234, a memory controller 235, and a purchase menu decoder 233 to request a contents purchase by users. Functions of such components included in the contents reproducing apparatus 23 will be described herein.

Figure 3:
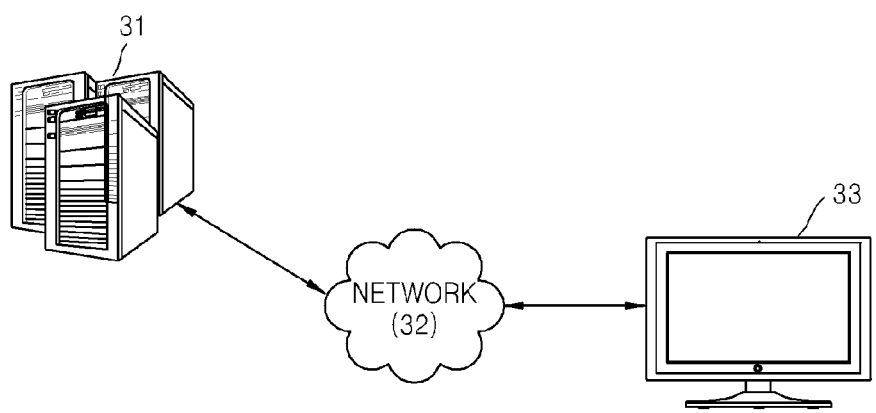
FIG. 3 is a diagram schematically illustrating a contents purchase system via a wired/wireless network according to another embodiment of the present general inventive concept.

FIG. 3 is a diagram illustrating a formation of a contents purchase system via a wired/wireless network 32 according to another embodiment of the present general inventive concept.

The contents purchase system embodiment via the network as illustrated in FIG. 3 can include a contents providing server 31, the wired/wireless network 32, and a contents reproducing apparatus 33.

Figure 4B:
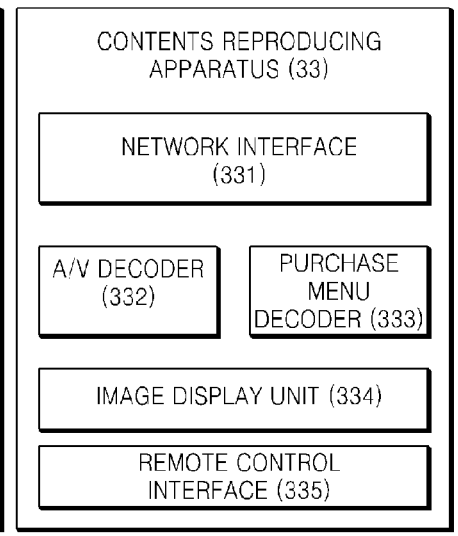

In the embodiment of FIG. 3, the contents providing server 31 and the contents reproducing apparatus 33 may directly transmit contents data and a user purchase application via the wired/wireless network 32, and thus, compared to the embodiment of the contents purchase system of FIG. 2, the portable storage medium 24 and the kiosk 25 are not required. An exemplary embodiment of the contents reproducing apparatus 33 according to the embodiment of FIG. 3 is illustrated in FIG. 4B.

As illustrated in FIG. 4A, an exemplary embodiment of the contents reproducing apparatus 33 may include an A/V decoder 332, and an image display unit 334 as components for reproducing contents. Besides these components for reproducing contents, the contents reproducing apparatus 33 may further include a remote control interface 335, a network interface 331, and a purchase menu decoder 333 to request a contents purchase by users. Identically named components of embodiments of FIGS. 4A and 4B may perform similar functions described herein.

Figure 5:
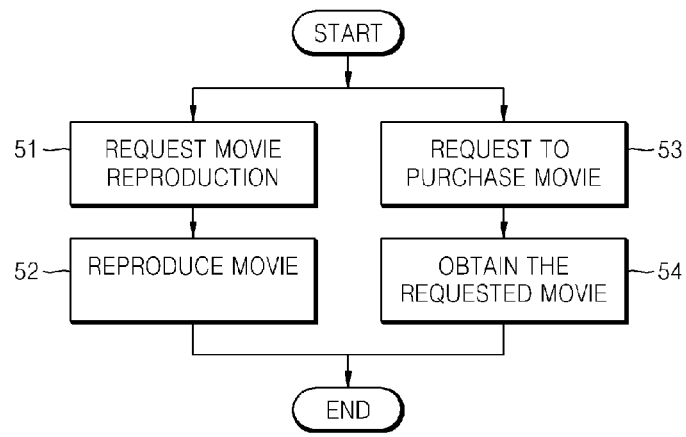
FIG. 5 is a flowchart illustrating a method of purchasing contents according to an embodiment of the present general inventive concept.

FIG. 5 is a flowchart illustrating a method of purchasing contents, according to an embodiment of the present general inventive concept. The contents purchasing method embodiment of FIG. 5 will be described using the embodiments of FIGS. 2-3, however, the method embodiment of FIG. 5 is not intended to be limited thereby. Hereinafter, for convenience of explanation, a movie is selected as an example of contents to be purchased. However, the present general inventive concept is not limited thereto, and thus, some other examples of contents to be purchased or reproduced according to the present general inventive concept can also be various kinds of A/V data such as music, TV broadcasting programs, computer games, UCC, and so on.

A user may select (e.g., remote control interface 234 or remote control interface 335) one of movie files supplied to one of the contents reproducing apparatuses 23 and 33 via the portable storage medium 24 or the wired/wireless network 32, respectively, and request reproduction (operation 51).

Then, A/V data included in the selected movie file is reproduced (operation 52). The movie file may include not only data related to the movie but also additional data such as preview data for advertising movies (e.g., to be released at a later time).

As described above, a user may watch a movie reproduced in one of the contents reproducing apparatuses 23 and 33, and simultaneously request a purchase of a movie related to the movie being reproduced (operation 53).

The movie requested to purchase in operation 53 can be obtained in an off-line manner, e.g., the kiosk 25 and the portable storage medium 24, or in an on-line manner, e.g., via the wired/wireless network 32 (operation 54).

Operations 51 and 52, and operations 53 and 54 can be performed in parallel without having a specific order.

Figure 6:
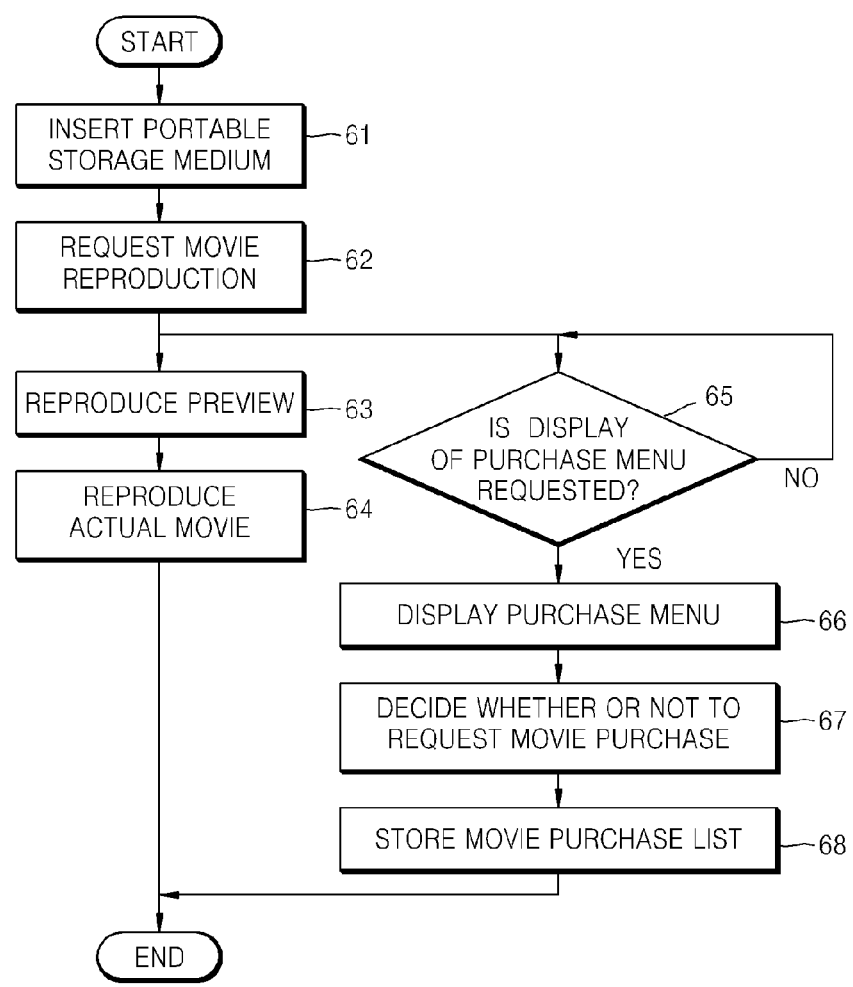
FIG. 6 is a flowchart illustrating a method of storing contents purchase information using a portable storage medium according to another embodiment of the present general inventive concept.

FIG. 6 is a flowchart illustrating a method of storing contents purchase information by using the portable storage medium 24 according to another embodiment of the present general inventive concept. FIG. 6 illustrates a more detailed embodiment as compared to the method of purchasing contents of FIG. 5. For example, all operations 61 through 68 of the method of FIG. 6 may correspond to operations 51 through 53 of the method embodiment of FIG. 5.

First, the portable storage medium 24 including data related to movie reproduction may be inserted to the contents reproducing apparatus 23 (operation 61). The data related to the movie reproduction may include A/V data (e.g., moving picture data), header data, index data, metadata, purchase menu data, and the like. The header data may include information regarding a file title or a file size. The index data may include information regarding a data sequence. The metadata can be necessary to reproduce contents, and may include an encoding manner, a size of an image, a reproduction time, and the like. The purchase menu data may be required for a user to purchase movies, and may include information regarding a preview or a sequel, a purchase list, and so on.

A user may select one of movies stored in the portable storage medium 24, and request reproduction (e.g., remote control interface 234) (operation 62).

The A/V decoder 232 decodes A/V data of the selected movie, and outputs the decoded A/V data to the image display unit 231. If the A/V data includes data related to a preview, the preview is preferably reproduced before reproducing the movie (operations 63 and 64).

When the user desires to purchase a movie related to the preview or the sequel to the movie while watching the preview or the movie, the user may select a purchase menu display button of a remote control (not shown) (operation 65).

Figure 7A:
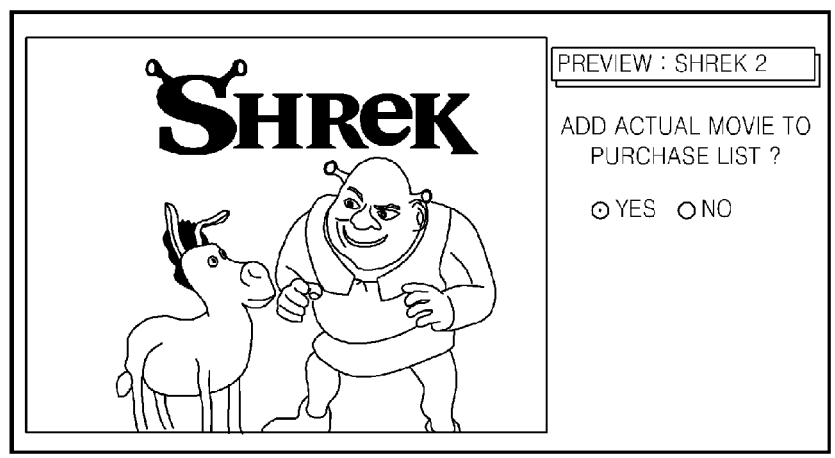
FIGS. 7A and 7B illustrate examples corresponding to purchase menus displayed on an image display unit of a contents reproducing apparatus.
Figure 7B:

When the contents reproducing apparatus 23 receives a remote control signal indicating a purchase menu display request via the remote control interface 234, the contents reproducing apparatus 23 first analyzes the type of A/V data that is currently being reproduced. From the analysis, if the type of the A/V data that is currently being reproduced is a preview, a purchase menu for the movie corresponding to the preview is displayed as illustrated in FIG. 7(a). On the other hand, if the A/V data currently being reproduced is an actual movie, not a preview, and corresponds to a serial movie, a purchase menu for a movie sequel to the current movie is displayed as illustrated in FIG. 7B (operation 66). At this time, for example, a purchase menu decoder 233 may be used to decode purchase menu data.

FIGS. 7A and 7B illustrate examples corresponding to purchase menus that may be displayed on the image display unit 231 of the contents reproducing apparatus 23 in operation 66. FIG. 7A is the example purchase menu for the movie corresponding to the preview, and FIG. 7B is the example purchase menu to purchase the sequel movie.

The user then may decide whether to request a movie purchase (operation 67). For example, the user may decide whether to request the movie purchase while watching the purchase menus illustrated in FIGS. 7A and 7B displayed in operation 66 by using a remote control, or the like.

When the user decides to request the movie purchase in operation 67, information regarding the movie purchase requested by the user is preferably added to a movie purchase list stored in the portable storage medium 24 (operation 68). For example, the memory controller 235 may be used to record the purchase list or the purchase menu data on the portable storage medium 24.

Although in FIG. 6, operation 65 is exemplary illustrated occurring before operation 63, according to embodiments operation 65 may occur before, during, after or concurrent with operations 63 and/or 64. Further, although preview data is illustrated, additional related movie materials such as bonus material, actor/director interviews, scenes may be considered part of the movie or a related preview.

Figure 8:
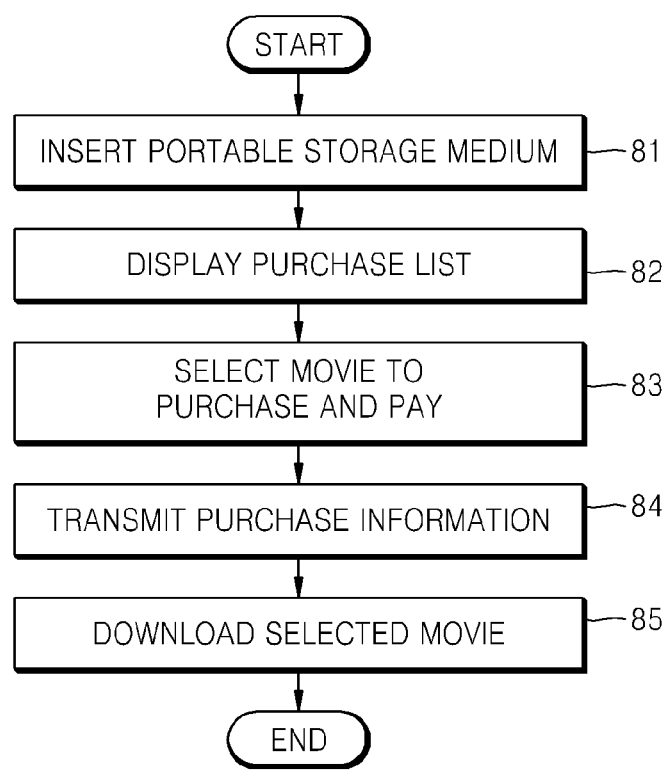
FIG. 8 is a flowchart illustrating a method of purchasing contents using a portable storage medium according to another embodiment of the present general inventive concept.

FIG. 8 is a flowchart illustrating a method of purchasing contents by using the portable storage medium 24, according to another embodiment of the present general inventive concept. Operations 81 through 85 of FIG. 8 may correspond to operation 54 of the method of purchasing contents embodiment in FIG. 5. The method embodiment according to FIG. 8 will be described using and may be performed by the contents purchase system embodiment of FIG. 2, however the method embodiment of FIG. 8 is not intended to be limited thereby.

First, a user may couple or insert the portable storage medium 24 to the kiosk 25 (operation 81), and the portable storage medium 24 may store a movie purchase list. For example, the movie purchase list may be obtained by the method of storing the contents purchase information embodiment according to the present general inventive concept described herein (e.g., FIG. 6).

The kiosk 25 preferably decodes the movie purchase list stored in the portable storage medium 24, and then can operate to visually display the movie purchase list to the user (operation 82).

Figure 11:
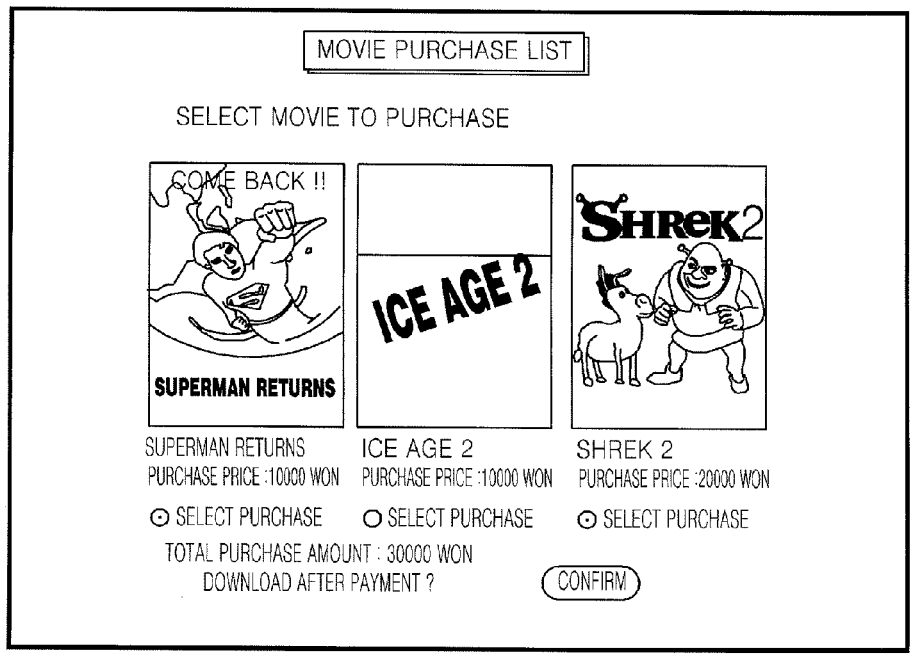
FIG. 11 illustrates an example of a movie purchase list according to another embodiment of the present general inventive concept.

FIG. 11 is a diagram that illustrates an example of a movie purchase list according to another embodiment of the present general inventive concept. Referring to FIG. 11, movies purchases that have been requested by the user (e.g., operation 67 of the method of FIG. 6), and a purchase price for the respective movies may be displayed in the movie purchase list. The movie purchase list can request the user to select (e.g., confirm) a movie to be purchased, or the like.

The user may select all desired movies from among one or more movies included in the movie purchase list, and then, pay for the total purchase amount (operation 83).

The kiosk 25 preferably transmits purchase information regarding the movies selected by the user (e.g., and paid) in operation 83 to the contents providing server 21 (operation 84), and the contents providing server 21 preferably transmits movie data corresponding to the purchase information to the kiosk 25. Such movie data received by the kiosk 25 may be stored in the portable storage medium 24 (e.g., by the memory controller 235) (operation 85). Alternative implementations of the kiosk 25 and the contents providing server 21 may be used according to the present general inventive concept to provide the described functions of remote selection, payment and content data transfer to the portable storage medium 24.

Contents purchased/stored by using the method of purchasing contents embodiment using the portable storage medium 24 described in FIG. 8 are preferably designed to be automatically deleted or to be non-reproducible after being reproduced one time (e.g., after a prescribed number of times or after a predetermined period). Preferably, users do not need to again visit a contents rental shop corresponding to the movie purchase to return borrowed contents, and an owner of a contents rental shop may reduce the likelihood or preferably prevent contents from being unfairly reproduced by many people.

Figure 9:
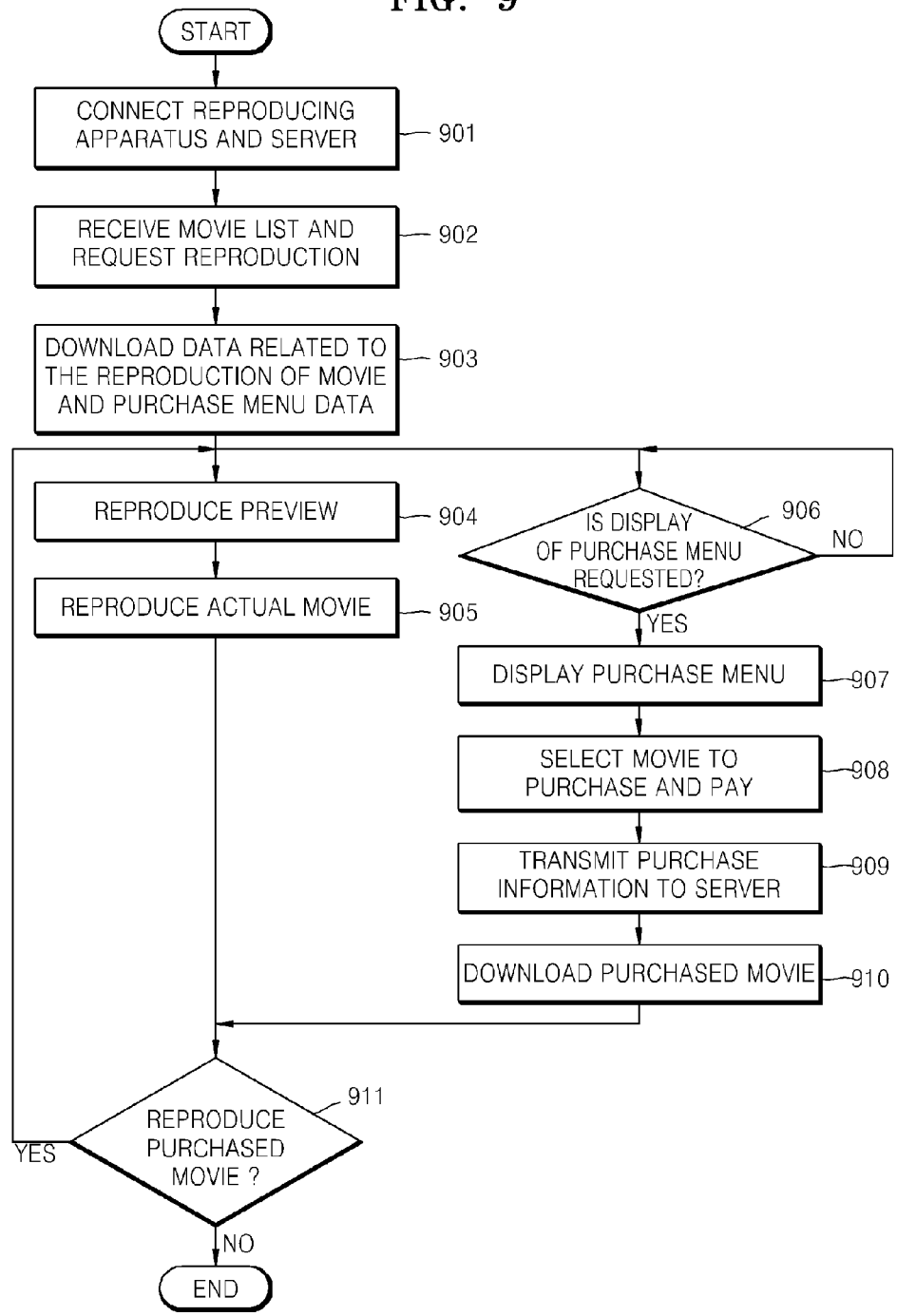
FIG. 9 is a flowchart illustrating a method of purchasing contents via a network according to another embodiment of the present general inventive concept.

FIG. 9 is a flowchart illustrating a method of purchasing movies via a network, according to another embodiment of the present general inventive concept. The method embodiment of FIG. 9 can correspond to the method of purchasing contents embodiment described in FIG. 5. The method embodiment according to FIG. 9 will be described using and may be performed by the contents purchase system via a network embodiment of FIG. 3, however the method embodiment of FIG. 9 is not intended to be limited thereby.

First, the contents providing server 31 and the contents reproducing apparatus 33 are electrically connected via the wired/wireless network 32 (operation 901).

The contents reproducing apparatus 33 preferably receives a movie list provided from the contents providing server 31 to display the movie list on an image display unit 334 of a content reproducing apparatus 33. A user may select a desired movie from the movie list, and then request reproduction (e.g., remote control interface 335) (operation 902).

The contents providing server 31, which received information regarding the selected movie, may transmit data related to the reproduction of the movie (such as A/V data, purchase menu data, and the like) to the content reproducing apparatus 33 (operation 903).

The data transmitted in operation 903 may be reproduced in an order of a preview and the movie (operations 904 and 905). Operations 904 and 905 are preferably the same as operations 63 and 64 of FIG. 6.

When a user requests display of a purchase menu while watching the movie, a movie purchase menu can be displayed on the image display unit 334 (operations 906 and 907). Operations 906 and 907 are preferably the same as operations 65 and 66 of FIG. 6.

The user may select a movie to purchase through the movie purchase menu displayed on the image display unit 334, and pay the purchase amount (operation 908).

Information regarding the movie selected in operation 908, that is, purchase information, is transmitted to the contents providing server 31 (e.g., via a network interface 331 of the contents reproducing apparatus 33) (operation 909).

The contents providing server 31 may receive the purchase information, and transmit data related to reproduction of the purchased movie to the contents reproducing apparatus 33 (operation 910).

The user is preferably asked whether the downloaded movie is to be reproduced (operation 911), and if the user wants the downloaded movie to be reproduced, the movie may be reproduced (e.g., by again performing operations 904 through 910).

Although in FIG. 9, operation 906 is exemplary illustrated occurring before operation 904, according to embodiments operation 906 may occur before, during, after or concurrent with operations 904 and/or 905.

Figure 10:
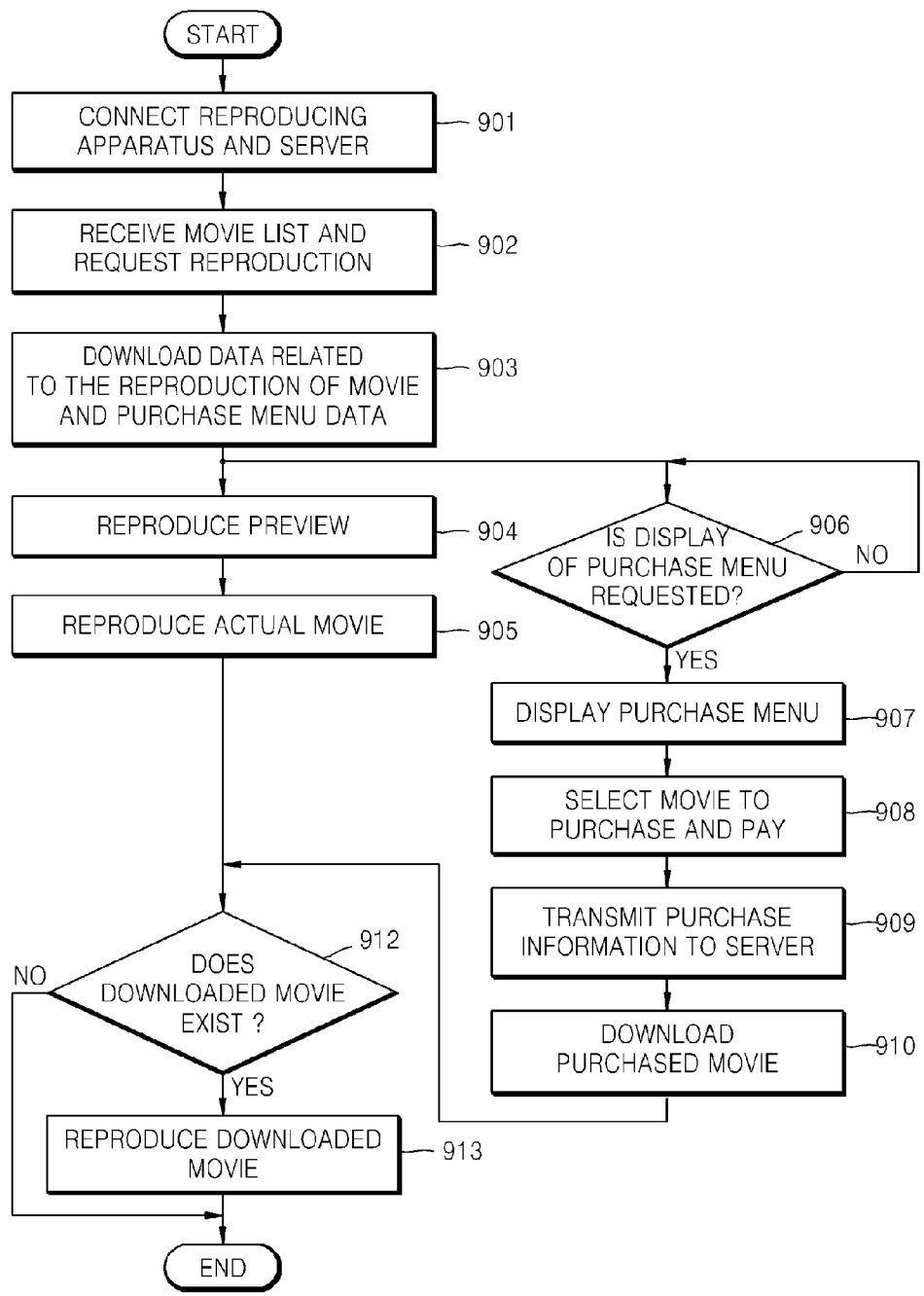
FIG. 10 is a flowchart illustrating a method of purchasing contents via a network according to yet another embodiment of the present general inventive concept.

FIG. 10 is a flowchart illustrating a method of purchasing movies via a network, according to another embodiment of the present general inventive concept.

Most operations of the method embodiment of FIG. 10 are similar or the same as operations of the method embodiment of FIG. 9. However, when there is data of a downloaded movie, the process according to the method embodiment in FIG. 9 returns to operation 904. On the other hand, when there is data of a downloaded movie, the process according to the method embodiment in FIG. 10 can automatically reproduce the downloaded movie regardless of the intention of the user (operation 912).

The method of purchasing movies via the network according to the present general inventive concept described in relation to FIGS. 9 and 10 may further include the operation of monitoring a transmission channel of the wired/wireless network 32 by the contents providing server 31. For example, after the contents providing server 31 has received a request for a movie purchase from a user, the contents providing server 31 may monitor the transmission channel of the wired/wireless network 32, and then determine whether there is available channel bandwidth in which data related to reproduction of the movie requested to purchase is to be transmitted. When other users are using all of the transmission channels, whereby it is not possible to secure channel bandwidth for the user, the contents providing server 31 may refuse the request for the movie purchase from the user.

However, in another embodiment of the present general inventive concept, even if it is not currently possible to secure a channel bandwidth necessary for transmission of the movie, the contents providing server 31 may not refuse a request for a movie purchase, but may receive the request for the movie purchase and then transmit data related to the reproduction of the movie at a later time when a channel bandwidth for the transmission of the movie is available Contents purchased by using the method and apparatus to purchase contents according to the present general inventive concept are designed to be automatically deleted or to be non-reproducible after being reproduced one time or after a predetermined period, and accordingly users do not need to again visit a contents rental shop to return contents. Further, an owner of a contents rental shop may prevent contents from being unfairly reproduced by many people.

The method and apparatus to purchase contents according to the present general inventive concept can enable users to conveniently request a contents purchase via the portable storage medium, the wired/wireless network or the like, which may decrease user inconvenience caused by the conventional manner in which users have to memorize information related to contents and visit a rental shop to obtain desired contents.

The portable storage medium or network resources used for the present general inventive concept are capable of repeatedly being used without limitation, and thus, the present general inventive concept may contribute to the saving of resources.

The present general inventive concept can also be embodied as computer readable codes on a computer readable recording medium. The computer readable recording medium is any data storage device that can store data, which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

Embodiments according to the present general inventive concept are described with reference to block diagrams or flowchart illustrations. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

Although a few embodiments of the present general inventive concept have been illustrated and described, it will be appreciated by those skilled in the art that changes may be made in these embodiments without departing from the principles and spirit of the present general inventive concept, the scope of which is defined in the appended claims and their equivalents. As used in this disclosure, the term "preferably" is non-exclusive and means "preferably, but not limited to." Terms in the claims should be given their broadest interpretation consistent with the present general inventive concept as set forth in this description. For example, the terms "coupled" and "connect" (and derivations thereof) are used to connote both direct and indirect connections/couplings. As another example, "having" and "including", derivatives thereof and similar transitional terms or phrases are used synonymously with "comprising" (i.e., all are considered "open ended" terms)—only the phrases "consisting of" and "consisting essentially of" should be considered as "close ended". Claims are not intended to be interpreted under 112 sixth paragraph unless the phrase "means for" and an associated function appear in a claim and the claim fails to recite sufficient structure to perform such function.

What is claimed is:

1. A contents reproducing apparatus to reproduce contents and to purchase other contents related to the reproduced contents by using a portable storage medium, the contents reproducing apparatus comprising:
   an A/V (audio/video) decoder to decode A/V data from among data related to the reproduced contents to determine whether the reproduced contents include a movie or a preview of the movie;
   a memory controller to record, within the portable storage medium, purchase menu data corresponding to the determination in response to a request to purchase the other contents, such that the other contents include one of a sequel to the movie and the movie when the reproduced contents include one of the movie and the preview of the movie, respectively;
   a purchase menu decoder to decode the purchase menu data; and
   an image display unit to display the reproduced contents, and to display a purchase menu corresponding to the purchase menu data during the reproduction of the reproduced contents,
   wherein the memory controller selectively populates a purchase list with the purchase menu data in response to each request to purchase the other contents via the purchase menu, and the purchase menu decoder decodes purchase menu data included in the purchase list while the A/V decoder simultaneously decodes the A/V data.

2. The contents reproducing apparatus of claim 1, wherein the portable storage medium is one of a USB (Universal Serial Bus) memory, a secure digital card, a multimedia card, a compact flash, or an eXtreme disk.

3. A contents reproducing apparatus to reproduce contents and to purchase other contents related to the reproduced contents via a network, the contents reproducing apparatus comprising:
   a network interface interfacing to perform data communication between a contents providing server and the contents reproducing apparatus;
   an A/V (audio/video) decoder to decode A/V data from among data related to the reproduced contents stored in a portable storage medium to determine whether the reproduced contents include a movie or a preview of the movie;
   a purchase menu decoder to decode purchase menu data corresponding to the determination in response to a request to purchase the other contents, such that the other contents include one of a sequel to the movie and the movie when the reproduced contents include one of the movie and the preview of the movie, respectively;
   a image display unit to display the reproduced contents, and to display a purchase menu corresponding to the purchase menu data while simultaneously reproducing the reproduced contents on the image display; and
   a memory controller to generate a purchase list within the portable storage medium including the purchase menu data corresponding to other contents requested to be purchased in response to each selected request to purchase via the purchase menu,
   wherein the purchase menu decoder decodes the purchase menu data included in the purchase list while the A/V decoder simultaneously decodes the A/V data.

4. A contents purchase system to reproduce contents and to purchase first and second contents using a portable storage medium, the contents purchase system comprising:
   a contents providing server storing the first contents to be purchased;
   a kiosk having the second contents to be purchased stored therein and operable in an off-line mode and an on-line mode to read a contents purchase information from the portable storage medium and to transmit the contents purchase information to the contents providing server, and to receive data related to the reproduction of contents from the contents providing server and to transfer the second contents and the first contents to the portable storage medium based on the off-line mode and the on-line mode, respectively, and to store the received data in the portable storage medium, the on-line mode being initiated when the first contents is unavailable in the off-line mode; and
   a contents reproducing apparatus to reproduce the contents by using the data related to the reproduction of contents, and to determine whether the reproduced contents include a movie or a preview of the movie, such that the first and second contents include one of a sequel to the movie and the movie when the reproduced contents include one of the movie and the preview of the movie, respectively,
   wherein the portable storage medium stores the contents purchase information of users within at least one purchase list and stores at least one of the first and second contents downloaded from the kiosk in response to each purchase of the contents.

5. The contents purchase system of claim 4, wherein the contents reproducing apparatus processes a contents purchase request by users.

6. The contents purchase system of claim 4, wherein the data related to the reproduction of contents comprises purchase menu data used to request a contents purchase by users.

7. A method of reproducing purchased audio/video contents and purchasing other contents that are related to the reproduced contents, the method comprising:
   reproducing the purchased audio/video contents;
   determining whether the reproduced purchased audio/video contents include a movie or a preview of the movie;
   purchasing the other contents related to the purchased audio/video contents being reproduced, such that the other contents include one of a sequel to the movie and the movie when the reproduced purchased audio/video contents include one of the movie and the preview of the movie, respectively;
   generating a purchase list including content requested to be purchased corresponding to the purchased audio/video contents being reproduced via a purchase menu displayed during the reproducing of the purchased audio/video contents in response to each request to purchase of the other contents;

storing the generated purchase list in a portable storage medium; and obtaining the content requested to be purchased related to the purchased audio/video contents being reproduced included in the purchase list in the portable storage medium while simultaneously reproducing the purchased audio/video contents.

8. A method of storing contents purchase information by using a portable storage medium, the method comprising:

displaying a contents purchase menu while reproducing a purchased contents;

determining whether the reproduced purchased contents include a movie or a preview of the movie;

purchasing other contents related to the reproduced purchased contents using the contents purchase menu while simultaneously reproducing the purchased contents, such that the other contents include one of a sequel to the movie and the movie when the reproduced purchased contents include one of the movie and the preview of the movie, respectively;

generating a purchase list including content requested to be purchased corresponding to the reproduced purchased contents via the contents purchase menu in response to each purchase of the other contents; and storing the generated purchase list and information regarding the content requested to be purchased included in the generated purchase list in the portable storage medium.

9. The method of claim 8, wherein the portable storage medium comprises a contents list for storing purchase information.

10. The method of claim 8, further comprising reproducing contents.

11. The method of claim 10, wherein, when the contents being reproduced is the preview of the movie, the displaying of the contents purchase menu comprises displaying a purchase menu for purchasing the movie of the preview.

12. A method of reproducing purchased contents and purchasing other contents related to the reproduced contents by using a portable storage medium, the method comprising:

determining whether the reproduced purchased contents include a movie or a preview of the movie;

generating a contents purchase list in response to a request to purchase the other contents and during reproduction of the reproduced purchased contents via a purchase menu displayed during the reproducing, the contents purchase list including the other contents corresponding to the reproduced purchased contents, such that the other contents include one of a sequel to the movie and the movie when the reproduced purchased contents include one of the movie and the preview of the movie, respectively;

inserting the portable storage medium, in which the contents purchase list is stored, to a public terminal;

reading the contents purchase list from the portable storage medium using the public terminal and selecting the other contents to be purchased from the contents purchase list stored on the portable storage medium; and downloading data related the other contents included in the content purchase list to the public terminal, and storing the other contents related to the reproduced purchased contents in the portable storage medium using the public terminal.

13. The method of claim 12, wherein the selecting of the contents comprises:

displaying a purchase list; and selecting one or more contents by the users, wherein the contents are comprised in the contents purchase list.

14. The method of claim 12, wherein the contents is one of movies, music, TV (television) broadcasting programs, computer games, and UCC (User Created Contents).

15. The method of claim 12, wherein the data related to the reproduction of the selected contents comprises A/V data, header data, index data, metadata, and purchase menu data.

16. A method of reproducing purchased contents and purchasing other contents via a network, the method comprising:

reproducing the purchased contents;

determining whether the purchased contents that are being reproduced include a movie or a preview of the movie;

displaying a purchase menu to purchase the other contents related to the purchased contents during the reproducing of the purchased contents:

requesting purchasing the other contents via the purchase menu displayed, such that the other contents include one of the sequel to the movie and the movie when the purchased contents include one of the movie and the preview of the movie, respectively;

generating a purchase list indicating content requested to be purchased corresponding to the purchased contents in response to a request to purchase the other contents via the purchase menu;

transmitting purchase information regarding the other contents while the purchased contents are being reproduced, to a contents providing server via the network; and decoding the purchased other contents included in the purchase menu during the reproducing of the purchased contents.

17. The method of claim 16, further comprising downloading data, which is related to the reproduction of the contents requested to purchase, from the contents providing server.

18. The method of claim 16, further comprising monitoring a transmission channel of the network for transmission bandwidth by the contents providing server.

19. A non-transitory computer readable medium having stored thereon instructions for use with a content purchase system, the instructions comprising:

first instructions to display a contents purchase menu while a previously purchased contents is reproduced;

second instructions to determine whether the previously purchased contents include a movie or a preview of the movie;

third instructions to purchase contents corresponding to the previously purchased contents being reproduced by using the contents purchase menu, such that the contents include one of a sequel to the movie and the movie when the previously purchased contents include one of the movie and the preview of the movie, respectively;

fourth instructions to generate a purchase list indicating a request to purchase the contents corresponding to the previously purchased contents being reproduced; and fifth instructions to store information regarding the contents requested to be purchased included in the purchase list and the purchase list in a portable storage medium while the previously purchased contents is reproduced.

20. A method of reproducing purchased audio/video contents and purchasing other contents through a reproduction apparatus, the method comprising:

reproducing a purchased audio/visual contents at the reproduction apparatus;

determining whether the reproduced purchased audio/video contents include a movie or a preview of the movie;

displaying a purchase menu to select the other contents corresponding to the reproduced purchased audio/visual contents while simultaneously reproducing the purchased audio/visual contents, such that the other contents include one of a sequel to the movie and the movie when the reproduced purchased audio/video contents include one of the movie and the preview of the movie, respectively;

generating a purchase list including the other contents in response to the other contents being requested to be purchased via the purchase menu, displaying the purchase list populated with the other contents during reproduction of the purchased audio/visual contents;

receiving the other contents included in the purchase list from the contents provider and storing the purchase list and the received other contents on a portable storage medium; and directly performing one of reproducing the sequel to the movie and the related movie based on the determination.

21. The method of claim 20, wherein the directly purchasing comprises:
storing the purchase list on the portable storage medium;
electronically connecting the portable storage medium with a contents provider;
paying a corresponding cost for the purchased other contents;
reproducing the stored purchased other contents; and
deleting the stored purchased other contents from the portable storage medium after a single reproduction.

22. The method of claim 20, wherein the directly purchasing comprises:
displaying a purchase list populated with data for the sequel or the corresponding movie as selected contents;
electronically connecting the reproduction apparatus with a contents provider;
paying a corresponding cost for the selected contents;
receiving the selected contents from the contents provider and reproducing the selected contents on the reproduction apparatus; and
making the reproduced selected contents not reproducible after a single reproduction at the reproduction apparatus.

23. A contents purchase system, the contents purchase system comprising:
a contents providing server to provide previously purchased contents;
a memory controller to generate a purchase list indicating new contents corresponding to the previously purchased contents in response to purchases of contents input via a purchase menu displayed during reproduction of the previously purchased contents and to determine whether the reproduced previously purchased contents include a movie or a preview of the movie, such that the new contents include one of a sequel to the movie and the movie when the reproduced previously purchased contents include one of the movie and the preview of the movie, respectively;
an interface unit to communicate the purchase list indicating the new contents corresponding to the previously purchased contents to the contents providing server and to download for limited reproduction the new contents identified by the contents purchase list while simultaneously reproducing the previously purchased contents.

24. The contents purchase system of claim 23, wherein the limited reproduction is a single reproduction at a reproduction apparatus.

25. The contents purchase system of claim 23, wherein the interface unit comprises:
a remote terminal to transmit the contents purchase information to the contents providing server or to receive data related to the reproduction of contents from the contents providing server and store the received data in a portable storage medium; and
the portable storage medium to store contents purchase information of users or to store the new purchased contents and data related to the reproduction of contents downloaded from the remote terminal.

26. The contents purchase system of claim 25, further comprising:
a contents reproducing apparatus to reproduce the new purchased contents by using the data related to the reproduction of contents or to process a contents purchase request by users.

27. The contents purchase system of claim 26, wherein the contents reproducing apparatus comprises:
a purchase menu decoder to decode purchase menu data from among the data related to reproduction of contents stored in the portable storage medium;
a memory controller to record a purchase list in the portable storage medium; and
an A/V (audio/video) decoder to decode A/V data from among the data related to reproduction of contents stored in the portable storage medium.

28. The contents purchase system of claim 23, wherein the interface unit comprises:
a network to transmit the contents purchase information to the contents providing server, or receive data related to the reproduction of contents from the contents providing server and store the received data in a portable storage medium; and
a contents reproducing apparatus to store contents purchase information of users, or store the new purchased contents and data related to the reproduction of contents downloaded from the network.

29. The contents purchase system of claim 28, wherein the contents reproducing apparatus comprises:
a network interface to interface to perform data communication between the contents providing server and the contents reproducing apparatus; and
a purchase menu decoder to decode purchase menu data from among the data related to reproduction of contents received by the network interface.

30. The contents purchase system of claim 23, wherein the new purchased contents comprise a movie corresponding to a currently viewed preview or a sequel to a currently viewed movie reproduced on a image display unit of a contents reproduction apparatus.

31. A non-transitory computer readable medium having stored thereon instructions for use with a contents purchase system, the instructions comprising:
reproducing a purchased audio/visual contents at a reproduction apparatus including a display screen;
determining whether the reproduced purchased audio/visual contents include a movie or a preview of the movie;
displaying a purchase menu to purchase other contents related to the purchased audio/visual contents while simultaneously reproducing the reproduced purchased audio/visual contents, such that the other contents include one of a sequel to the movie and the movie when the reproduced purchased audio/video contents include one of the movie and the preview of the movie, respectively;

generating a purchase list including other contents corresponding to the reproduced purchased audio/visual contents, in response to purchases of each of the other contents via the purchase menu, displaying the purchase list populated with the other contents to identify at least one of the sequel and the movie;

receiving the other contents included in the purchase list from the contents provider and storing the received other contents and the purchase list on the portable storage medium; and executing at least one of the sequel and the movie corresponding to the reproduced purchased audio/video contents on the display screen.

32. The method of claim 18, further comprising:

continuously monitoring the transmission bandwidth of the transmission channel when the transmission bandwidth is initially determined to be insufficient for the transmission of the purchased contents; and transmitting the purchased other contents at a later time when the transmission bandwidth of the transmission channel is determined sufficient for the transmission of the purchased other contents.

33. The method of claim 7, further comprising:

requesting the purchase of the other contents related to the reproduced purchased audio/video contents following a reproducing of a preview of the related contents.

* * * * *